US009776211B2

(12) United States Patent
Reed et al.

(10) Patent No.: US 9,776,211 B2
(45) Date of Patent: Oct. 3, 2017

(54) METHODS OF FILLING WOOD VOIDS AND REDUCING WASTE IN PRODUCTION OF COATED WOOD PRODUCTS

(71) Applicant: Andersen Corporation, Bayport, MN (US)

(72) Inventors: Stacha Lynn Reed, River Falls, WI (US); James Gerard Karras, Hudson, WI (US); Benjamin John Goebel, Stillwater, MN (US); David Kevin Hopps, Columbia Heights, MN (US)

(73) Assignee: Andersen Corporation, Bayport, MN (US)

( * ) Notice: Subject to any disclaimer, the term of this patent is extended or adjusted under 35 U.S.C. 154(b) by 0 days.

(21) Appl. No.: 14/285,069

(22) Filed: May 22, 2014

(65) Prior Publication Data

US 2015/0086772 A1 Mar. 26, 2015

Related U.S. Application Data

(60) Provisional application No. 61/882,058, filed on Sep. 25, 2013.

(51) Int. Cl.

| | |
|---|---|
| ***C09D 133/00*** | (2006.01) |
| ***B05D 3/06*** | (2006.01) |
| ***B05D 7/06*** | (2006.01) |
| ***B05D 1/28*** | (2006.01) |
| ***B27K 3/02*** | (2006.01) |
| ***B05D 3/12*** | (2006.01) |
| *B05D 7/00* | (2006.01) |
| *B05D 3/00* | (2006.01) |

(52) U.S. Cl.

CPC ................ *B05D 7/06* (2013.01); *B05D 3/12* (2013.01); *B27K 3/0278* (2013.01); *B05D 1/28* (2013.01); *B05D 3/007* (2013.01); *B05D 3/067* (2013.01); *B05D 7/51* (2013.01); *Y10T 428/249959* (2015.04); *Y10T 428/31906* (2015.04)

(58) Field of Classification Search

CPC .......... B05D 1/28; B05D 3/007; B05D 3/067; B05D 3/12; B05D 7/06

See application file for complete search history.

(56) References Cited

U.S. PATENT DOCUMENTS

| | | | |
|---|---|---|---|
| 3,967,581 | A | 7/1976 | Zirbel |
| 4,109,034 | A | 8/1978 | Welch |
| 5,115,844 | A | 5/1992 | Hansen |
| 5,147,486 | A | 9/1992 | Hoffman |
| 5,733,596 | A | 3/1998 | Arrington |

(Continued)

OTHER PUBLICATIONS

"How to Produce High Performance UV Curable Multilayer Coatings for Prefinished Parquet" datasheet. Decaux et al. CYTEC Surface Specialties, Drogenbos, Belgium; 9 pages.

Operation and Safety Instruction Manual for "Reverse Roll Filling Machine" Black Brothers, Mendota, IL; 23 pages.

"Standard Test Method for Humid-Dry Cycling for Coatings on Wood and Wood Products," Designation: D 3459-98, ASTM International, West Conshohocken, PA, May 10, 2008; 2 pages.

(Continued)

*Primary Examiner* — Dah-Wei D. Yuan
*Assistant Examiner* — Kristen A Dagenais
(74) *Attorney, Agent, or Firm* — Pauly, DeVries Smith & Deffner LLC

(57) ABSTRACT

Methods of reducing waste in the production of wood products, particularly a fenestration unit, and methods of coating a solid softwood component, as well as coated wood products are provided.

23 Claims, 4 Drawing Sheets

(56) References Cited

U.S. PATENT DOCUMENTS

| | | | | |
|---|---|---|---|---|
| 6,180,172 | B1 * | 1/2001 | Hasenkamp | B05C 1/006 118/106 |
| 6,309,492 | B1 | 10/2001 | Seidner | |
| 7,435,453 | B2 | 10/2008 | Chen et al. | |
| 7,498,061 | B2 | 3/2009 | Grunewalder et al. | |
| 7,582,690 | B2 | 9/2009 | Pearson et al. | |
| 8,113,143 | B2 * | 2/2012 | Prince | B05C 3/005 118/264 |
| 2002/0071701 | A1 * | 6/2002 | Sullivan | B41J 11/002 399/365 |
| 2004/0143034 | A1 * | 7/2004 | Primke | B29B 9/10 523/176 |
| 2009/0011214 | A1 * | 1/2009 | Wang | B27K 3/15 428/305.5 |
| 2012/0152450 | A1 * | 6/2012 | Jin | B05D 7/587 156/245 |

OTHER PUBLICATIONS

"Standard Test Methods for Measuring Adhesion by Tape Test," Designation: D3359-09, ASTM International, West Conshohocken, PA, Jun. 1, 2009; 8 pages.

"Standard Practice for Testing Water Resistance of Coatings in 100% Relative Humidity," Designation: D2247-11, ASTM International, West Conshohocken, PA, Feb. 1, 2011; 7 pages.

Jones, Donald T. of Black Brothers Co. based in Mendota, IL, "Finishing '83: Latest Roll Coater Technology for Improved Panel Finishing" Conference Proceedings, Cincinnati, Ohio; Oct. 10-13, 1983; 10 pages.

"Reverse Roll Coater" Product Description, Dubois Equipment Company, Inc. Jasper, IN; accessed online Jun. 7, 2013. Retrieved from the internet: <www.duboisequipment.com/productdetail277e.html?pid=10>; 1 page.

* cited by examiner

METHODS OF FILLING WOOD VOIDS AND REDUCING WASTE IN PRODUCTION OF COATED WOOD PRODUCTS

CROSS-REFERENCE TO RELATED APPLICATIONS

The present application claims priority to U.S. Provisional Application Ser. No. 61/882,058 filed on Sep. 25, 2013, which is incorporated herein in its entirety.

BACKGROUND

Coated wood products are used in the furniture, kitchen cabinet, flooring, and fenestration industries, among others. The coating may include paint, primer, stain, lacquer, varnish, or other such materials. Coatings are applied to wood for aesthetic reasons, surface smoothness, as well as protective barriers to prevent excessive moisture from reaching the wood substrate and accelerating decay.

Surface smoothness is an important feature of many wood products, in particular furniture and building components such as interior trim for windows and doors. Many wood surfaces are not naturally smooth, however. Wood surfaces may have textured structures due to the natural grain of the wood, as well as voids, such as imperfections including cracks, resin channels, knots, worm holes, and mechanical damage. Many voids can be remedied by coating the surface with a layer of polymeric material of sufficient thickness to level out many of the voids, including, for example, cracks. For example, because veneers are relatively thin, any cracks tend to be shallow, and thus fillable by a variety of known coating processes. In some instances, a process of coating, followed by sanding or other mechanical smoothing, may be effective in producing a smooth surface. In the case of some woods, in particular softwoods such as the conifers, the imperfections can take the form of deeper cracks and other voids that are not easily filled using conventional coating processes, due, for example, to the viscosity of the coating fluid, the narrow opening and shape of the crack, and possibly to trapped air in the voids.

Defects resulting from natural variation in the wood substrate as well as conditioning of the wood substrate result in significant scrap, aesthetic deficiencies, or costly labor, materials, and processes to repair those substrates. It is a known aspect of wood, that upon milling and fabrication of components for windows, doors, cabinets, or other products, checks, splits, or other defects may become apparent. No upstream process for solid wood substrate can eliminate the tendency for these naturally occurring aesthetic defects.

If noticed, these defects could be repaired, screened out, or tracked. If unnoticed, these defects (i.e., imperfections) might be covered by conventional coating processes, such as priming and topcoat application. Or, more commonly, these unnoticed defects become more pronounced after priming and topcoat application due to the inability of most coatings to bridge large checks/splits by conventional spray coating methods. In these cases, where the defects become more pronounced, a rework step may be needed to sand down the coated part, manually apply some filler putty to the check/split, and recoat the part with primer and topcoat. Or, the alternative may be to scrap the part due to the aesthetic and performance defect.

In the fenestration industry alone, the quantity of scrap wood and labor culling out such scrap can be quite significant. Because the imperfections are typically not noticed until after the wood is coated with a finish, such wood cannot be readily recycled. It is typically placed in landfills. Just in the fenestration industry, as much as 20% of the cut and trimmed components are wasted due to such imperfections.

Ignoring such defects is not acceptable in the manufacture of fenestration units. Upon building a door or window with a defect-containing component, that component would likely absorb more moisture than a component without a defect and promote more rapid decay. Also, the presence of wood substrate defects is increasing due to old wood depletion in the world market. New wood is more prone to developing imperfections such as checks and splits.

One method to preemptively repair wood substrate defects is to wrap the wood component with a veneer, plastic film, composite paper, or other material. The wrap material may be adhered to the wood substrate with adhesive. The film may cover defects such as checks/splits and prevent new defects from occurring by hiding the substrate. This protection comes at a high cost, as wrapping films can be expensive and each wrapping process must be tuned precisely to each component's geometry.

Thus, there is a need for an alternative method for preemptively repairing wood imperfections without costly wraps or manual labor or quality screening to identify defective parts.

SUMMARY

The present disclosure provides methods of reducing waste in the production of wood products, particularly a fenestration unit, and methods of coating a solid softwood component (which may or may not be used in the production of a fenestration unit). The present disclosure also provides coated wood products with at least a portion of the voids (including imperfections and man-made joints) at least partially filled, such as coated solid softwood components, which are typically used in a fenestration unit.

Significantly, methods of the present disclosure do not require knowing where the voids, particularly the imperfections, are located. That is, the voids, particularly imperfections, do not need to be readily apparent. Thus, labor involved in screening, repairing, and recoating the wood is reduced and often eliminated. Furthermore, methods of the present disclosure can be used even if the wood includes no voids, particularly imperfections, without detrimentally affecting the quality of optional over-coating(s) and without significant added cost in material or labor.

In one embodiment of the present disclosure, there is provided a method of reducing waste in the production of a fenestration unit, the method including: providing a population of solid wood components used in the production of a fenestration unit, wherein each individual solid wood component may or may not include one or more voids, particularly imperfections; applying a curable coating composition to at least one surface of each of the population of solid wood components to form a population of coated solid wood components; applying pressure (typically, of at least 30 pounds per square inch (psi)) to the at least one coated surface to force the coating composition into at least a portion of the one or more voids, particularly imperfections, if present; and curing the curable coating composition on each of the coated solid wood components, thereby reducing waste of the solid wood components that include one or more voids, particularly imperfections, if present.

In another embodiment of the present disclosure, there is provided a method of coating a solid softwood component, the method including: providing a solid softwood component including one or more voids, particularly imperfections; applying a curable coating composition to at least one surface of the solid softwood component to form a coated solid softwood component; applying pressure (typically, of at least 30 psi) to the at least one coated surface to force the coating composition into at least a portion of the one or more voids, particularly imperfections; and curing the curable coating composition to form a cured coating on the softwood component.

In another embodiment of the present disclosure, there is provided a coated solid softwood component that includes: a solid softwood component having at least one surface and one or more voids, particularly imperfections, in the surface, wherein at least a portion of the one or more voids, particularly imperfections, have a depth of greater than 25 mils; and a cured coating (preferably UV-cured) disposed directly on the entire surface and within at least a portion of the one or more voids, particularly imperfections (typically, to a depth of at least 4 mils).

In another embodiment of the present disclosure, there is provided a coated component of a fenestration unit that includes: a solid softwood component of a fenestration unit, the component having at least one surface and one or more voids, particularly imperfections, in the surface; and a cured coating disposed directly on the entire one surface and within at least a portion of the one or more voids, particularly imperfections (typically, to a depth of at least 4 mils).

The phrase "solid wood components" include workpieces (e.g., lineals, cut stock, boards, or other blanks) subsequently made into a shaped component, as well as intermediate or finally shaped components used in the manufacture of a wood product (e.g., a fenestration unit such as a window or door), a final wood product (e.g., an entire fenestration unit), adhesively assembled woodwork pieces (engineered glue-ups, and the like). In this context, the term "solid" does not include wood products having a very thin layer (less than 25 mils) of a veneer at the surface.

The term "void" includes man-made joints, defects, and imperfections. The terms "defect" and "imperfection" are used interchangeably and refer to those naturally occurring and/or pre-existing, i.e., formed in the wood during growth, milling, or drying that are typically referred to as resin canals, splits (e.g., check splits or hair checks), knots, worm holes, indentations, fissures, and other deep narrow voids, or combinations thereof. In certain embodiments, the term "void" herein does not include grains such as end-grains.

Herein, "waste" includes solid wood components which, upon being painted, have noticeable voids, particularly noticeable imperfections. Waste also includes solid wood components that have had the voids at least partially filled but that cannot be over-coated in a cost-effective manner or that have a poorly adhered over-coat.

Herein, "curable" means a material that is able to be toughened or hardened by cross-linking of polymer chains, e.g., such as occurs with thermoset materials.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.). Herein, "up to" a number (e.g., up to 50) includes the number (e.g., 50).

The term "room temperature" refers to a temperature of 20° C. to 25° C. or 22° C. to 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DRAWINGS

The disclosure may be more completely understood in connection with the following drawings.

DETAILED DESCRIPTION OF ILLUSTRATIVE EMBODIMENTS

The present disclosure provides methods of reducing waste in the production of wood products, particularly a fenestration unit, and methods of coating a solid softwood component (which may or may not be used in the production of a fenestration unit). The present disclosure also provides coated wood products with at least a portion of the voids, particularly imperfections, at least partially filled with a curable filler material.

Figure 1:
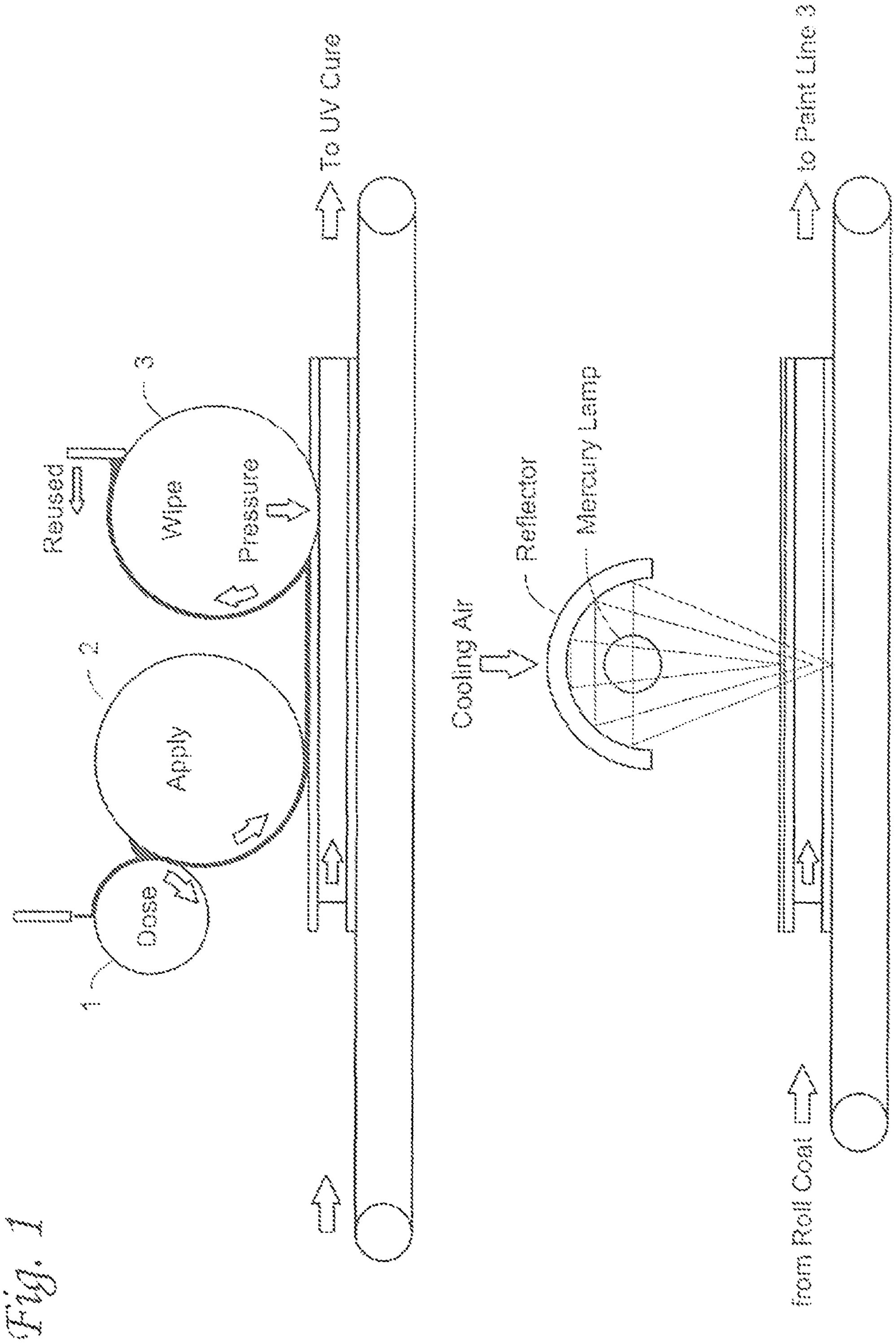
FIG. 1 is a schematic of an apparatus for carrying out a method of the present disclosure.

Typically, a method of the present disclosure involves applying a curable coating composition to at least one surface of a solid wood (preferably, softwood) component that includes one or more voids, particularly imperfections. Pressure is applied, simultaneously and/or subsequently, to the coated surface to force the coating composition into at least a portion of the one or more voids, particularly imperfections. Once at least a portion of the composition is pressed into the voids, particularly imperfections, the curable coating composition is cured. An exemplary embodiment of the process is shown in FIG. 1 and described in greater detail below.

Typically, an entire surface of a wood substrate, such as a flat surface of a solid softwood component, is coated with the coating composition, which is forced into at least a portion of the voids, particularly imperfections (e.g., checks/splits) present, and across the full face of the wood substrate in a generally thin (e.g., 0.1 mil to 2 mils thick) coating layer. Significantly, this method not only repairs such voids already present in the substrate but prevents similar new voids from developing. Furthermore, this method does not require knowing where the defects or imperfections are located. That is, the voids, particularly imperfections, do not need to be readily apparent. Thus, labor involved in screening, repairing, and recoating the wood is reduced and often eliminated. Furthermore, methods of the present disclosure can be used even if the wood includes no voids.

This is in contrast to processes that include filling deep narrow fissures, such as the process disclosed in U.S. Pat. No. 5,115,844. In this process glue is injected under pressure into cracks, such as those occurring around knots, so as to glue the knot in place and prevent a knothole from occurring when the knot falls out, as often happens. While effective in delivering glue to narrow cracks, the disclosed device must be applied to each crack individually, and makes no provision for repairing of other types of voids, particularly imperfections which may not be readily apparent.

The material used to at least partially fill at least a portion of the voids and coat the surface, according to the present disclosure, does not detrimentally effect the quality of any optional over-coatings (e.g., paints, lacquers, etc.). The material is a curable material. Typically, the curable material is a UV-curable material. UV-curable filler material is preferably one that strongly adheres to the wood substrate and possesses mechanical flexibility over a wide temperature range.

Unfortunately, the presence of wood substrate defects (i.e., imperfections) is increasing due to old wood depletion, and the fact that new wood is more prone to developing imperfections such as check/splits. Such imperfections, which may or may not be readily apparent upon visible inspection until they are painted, for example, include resin canals, splits (e.g., check splits or hair checks), knots, worm holes, indentations, fissures and other deep narrow voids, or combinations thereof. Such imperfections and other voids (e.g., man-made joints) typically have a depth of greater than 25 mils. Herein, voids are generally deeper than a typical veneer, which is generally 20-25 mils thick. For example, the average depth of a specific imperfection known as a check split, e.g., on Ponderosa Pine substrate, is 50 mils (±16 mils) and the average width is 6 mils (±2 mils). These check splits can be as deep as 80 mils or deeper and have an opening as wide as 10 mils or wider.

Figure 2:
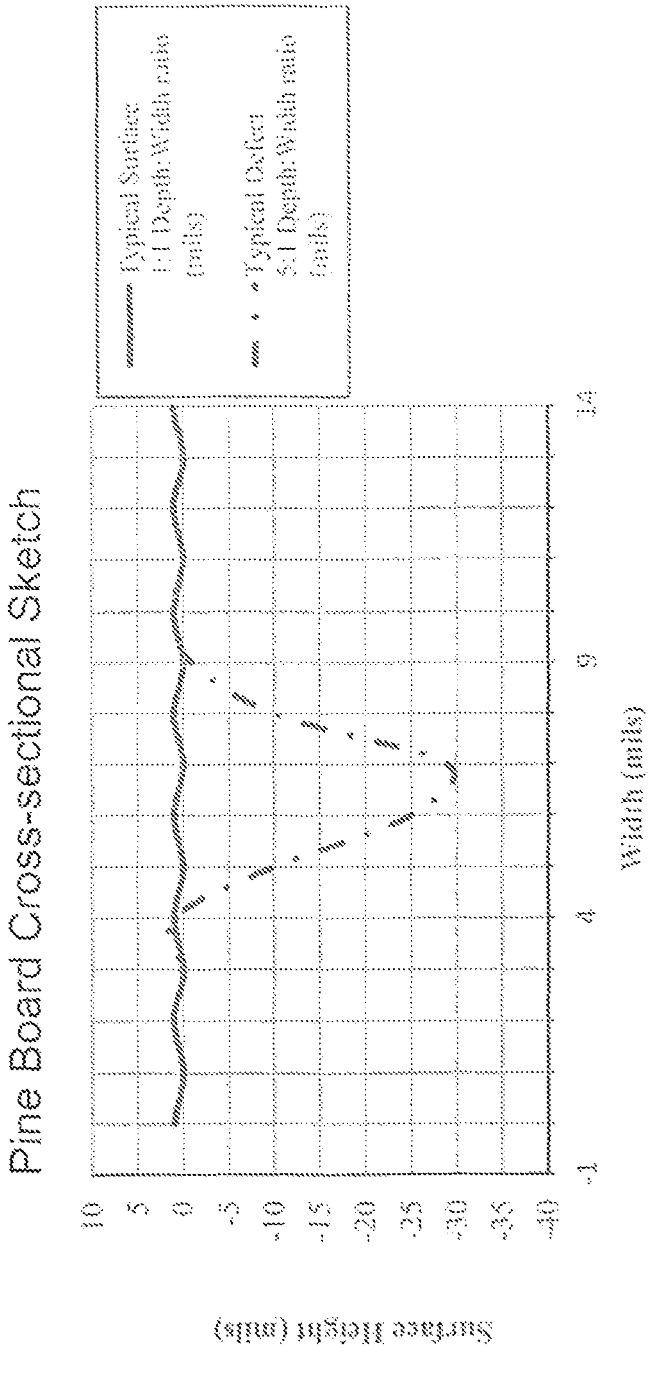
FIG. 2 is a sketch of a cross-section of a pine board including either a defect-free surface or a defect-containing surface.

Stated another way, the void depth to width ratio is typically greater than 1:1, or at least 3:1, or at least 5:1. Preferably, a 5:1 depth to width ratio is typically 30 mils deep by 6 mils peak to peak spacing (i.e., width). Thus, the voids that are referred to herein are not the natural roughness of a finished softwood surface, e.g., wherein a valley depth/valley width ratio is 1:1 (e.g., 1 mil deep by 1 mil peak to peak spacing (i.e., width)). This natural, gradual surface height variation is usually filled by conventional surface smoothing techniques. As shown in FIG. 2, a cross-section of a pine board includes either a defect-free surface (e.g., wherein the surface displays a 1:1 depth:width ratio) or a defect-containing surface (e.g., wherein the surface displays typical defects of 5:1 depth:width ratio).

In certain embodiments of the present disclosure, the voids are imperfections. In certain embodiments of the present disclosure, the imperfections are resin canals, check splits, or combinations thereof.

Typically, at least 1%, or at least 2%, or at least 5%, of a population of solid wood components includes one or more voids, particularly imperfections. Generally, even more solid wood components include voids, particularly imperfections. For example, often up to 10%, or up to 15%, and even as much as 20%, of a population of solid wood components include one or more voids, particularly imperfections. At least a portion of the one or more voids has a depth of greater than 25 mils. Prior to the methods of the present disclosure, this wood was waste, but because many imperfections are only noticeable after being painted, as much as an entire day per week of labor could be spent producing components that are subsequently culled out and disposed of into landfills. Because they are already painted, they cannot be recycled and are typically landfilled.

Thus, significantly, the present disclosure provides a method of reducing waste in the production of wood products, particularly fenestration units (e.g., windows, doors). Generally, this method includes: providing a population of solid wood components used in the production of a fenestration unit, wherein each individual solid wood component may or may not include one or more voids, particularly imperfections; applying a curable coating composition to at least one surface of each of the population of solid wood components to form a population of coated solid wood components; applying pressure to the at least one coated surface to force the coating composition into at least a portion of the one or more voids, particularly imperfections, if present; and curing the curable coating composition on each of the coated solid wood components, thereby reducing waste of the solid wood components that include one or more voids, particularly imperfections, if present.

Generally, the wood used in the manufacture of fenestration units is selected from a variety of softwoods, i.e., open grain woods (often obtained from conifers). Examples of sources of softwood include Araucaria, Cedar, Celery Top Pine (Phyllocladus aspleniifolius), Cypress (Chamaecyparis, Cupressus, Taxodium), Douglas-fir (Pseudotsuga menziesii), European Yew (Taxus baccata), Fir (Abies), Hemlock (Tsuga), Huon Pine, Macquarie Pine (Lagarostrobos franklinii), Kauri (New Zealand) (Agathis australis), Kauri (Queensland, Australia) (Agathis robusta), Kaya (Torreya nucifera), Larch (Larix), Pine (Pinus), "Redcedar," Redwood (Sequoia sempervirens), Rimu (New Zealand) (Dacrydium cupressinum), Spruce (Picea), Sugi (Cryptomeria japonica), "Whitecedar," and "Yellow-cedar" (Nootka Cypress Callitropsis nootkatensis, formerly Chamaecyparis nootkatensis).

The material used to at least partially fill at least a portion of the voids, particularly imperfections, and coat the surface, according to the present disclosure, preferably, does not detrimentally effect the quality of any optional over-coatings. Thus, at least one layer of an opaque coating composition (e.g., primer, paint, lacquer) can be disposed over the cured coating of components of the present disclosure.

Although preferred compositions are 100% solids due to minimal or no shrinkage in the coating composition upon curing, liquid diluents can be used in certain situations to reduce the percentage of solids if desired. Suitable liquid diluents include water, alcohols, ketones, glycol ethers, esters, mineral oils, toluene, xylene, petroleum distillates, and the like, and other viscosity modifying compounds such as waxes, surfactants, pigments, mineral or organic thickeners, deglossers, and adhesion promoters. If reduced percentage of solids compositions are used, the amount of wet film applied may have to be adjusted to ensure complete fill of defects/voids. Multiple, sequential layers of material may need to be applied to achieve adequate defect filling while minimizing shrinkage. That is, two or more applications of the curable coating composition and pressure may be used in methods of the present disclosure.

In certain embodiments, compositions of the present disclosure include at least 30% solids, at least 40% solids, at least 50% solids, at least 60% solids, at least 70% solids, at least 80% solids, or at least 90% solids. In certain embodiments, compositions of the present disclosure include 100% solids.

The material is a curable material that can be cured by a variety of techniques, including, for example, UV-curing, thermal curing, and the like. The composition is preferably a 100% solids, low Tg (e.g., less than 55° C. or less than 35° C.) material that strongly adheres to the wood substrate and possesses mechanical flexibility over a wide temperature range (e.g., from −5° F. to 200° F.) and wide humidity range (e.g., from 0% RH to 100% RH), and many combinations of high and low temperature and humidity, and many repetitive cycling tests between extreme environments.

Significantly, the present disclosure provides a method that balances the properties of durability (as demonstrated by ASTM D2247 and ASTM 3459) of a coating of a composition of the present disclosure, adhesion of an optional over-coating (as demonstrated by ASTM D3359), and acceptable appearance or aesthetics under a range of temperatures and humidities.

Acceptable appearance or aesthetics of a coating of compositions of the present disclosure includes a substantially defect-free surface. In particular, such surfaces coated with a composition of the present disclosure, particularly when over-coated with paint, for example, such surface can be defined by one or more of the following criteria: visibly free (to the naked eye) from flow lines, streaks, blisters or other surface imperfections in the dry film state; visibly free (to the naked eye) from orange peel, rough finish, paint bubbles, sags, drips, pinholes, fish eyes, micro-cracks, or bubbles; or visibly free under 10× magnification from orange peel, rough finish, paint bubbles, sags, drips, pinholes, fish eyes, micro-cracks, or bubbles.

The curable coating composition is typically a fluid having sufficient viscosity to at least partially flow into the voids with at least some applied pressure. Preferably, sufficient pressure is applied to force the curable coating composition into at least a portion of the one or more voids such that the curable coating composition at least partially fills at least a portion of the one or more voids.

A typical pressure applied to a coated composition of the present disclosure is at least 30 pounds per square inch (psi), or at least 50 psi, which is typically more pressure than is applied by a roll coater. In certain embodiments, pressure applied to a coated composition of the present disclosure is at least 80 psi. In certain embodiments, pressure applied to a coated composition of the present disclosure is up to 250 psi.

A typical viscosity of compositions of the present disclosure is at least 300 Centipoise (Cps) at room temperature, and often at least 10,000 Cps, or at least 17,000 Cps, or at least 19,000 Cps. A typical viscosity of compositions of the present disclosure is up to 150,000 Cps at room temperature, and often up to 23,000 Cps, or up to 20,000 Cps.

The curable coating composition can include a variety of resins, such as acrylics, polyurethanes, epoxies, epoxides, vinyl ethers, vinyl esters, isocyanates, vinyl alcohols, epoxy silanes, bisphenols, and carboxylates. Combinations of such resins can be used if desired. In certain embodiments, the coating composition is an acrylic-based coating composition. Such acrylic-based coating compositions can also include ester and/or epoxy groups. Preferred coating compositions are UV-curable compositions.

One preferred embodiment of the coating composition is that available from PPG under the tradename R2158Z-8. Once applied, this curable material is cured by a Mercury UV lamp.

Generally, in certain embodiments, suitable curable coating compositions are not conventional end-sealers or conventional glues or conventional wood putties.

This coated component can then be painted with a primer and paint. For example, it can be primed with a polyurea primer, oven cured, then painted with a topcoat (e.g., a paint that is available from PPG under the tradename FLEXACRON), then oven cured again, and subsequently used as a component of a sash unit.

In other embodiments, the over-coatings can include latexes, alkyds, acrylics, urethanes, polyesters, PVA's, and nylons, with such tradenames as PPG AQUALINK, Valspar DURAMAX, Sherwin Williams POLANE, Behr PREMIUM, and ChemCraft AQUAWHITE.

The methods of the present disclosure generally include applying a curable coating composition, applying pressure, and curing the curable coating composition. Generally, applying the coating composition includes rolling, spraying, dipping, vacuum coating, or the like. Generally, applying pressure to the coated curable composition includes rolling, injecting/spraying under pressure, knife coating, or the like. Generally, curing the coating composition includes applying ultraviolet light or other mechanisms of curing, e.g., thermal curing.

In certain embodiments, applying a curable coating composition and applying pressure occur at the same time. In this context, "same time" is meant that the application of the coating composition and application of pressure occurs in one step. In certain embodiments, applying pressure occurs after applying the curable coating composition. In certain embodiments, applying a curable coating composition and applying pressure occur at substantially the same speed. In this context, "substantially the same speed" is meant the speeds of the application of the coating composition (i.e., conveying) and the application of pressure (i.e., wiping) can fluctuate by 10% more or less than target.

In methods of the present disclosure, applying pressure includes applying sufficient pressure to avoid bridging (e.g., painting over the top of a void with no fill), thereby forcing the curable coating composition into at least a portion of the one or more voids, particularly imperfections, such that it at least partially fills at least a portion of the one or more voids, particularly imperfections (if present). In preferred embodiments, substantially all voids (at least 90%, or at least 95%) result with at least some material forced therein. In particularly preferred embodiments, substantially all voids (100%) result with at least some material forced therein (i.e., there are no "skips").

The voids, particularly imperfections, may be partially or completely filled. Generally, when at least 4 mils (and preferably, at least 8 mils or at least 10 mils) of the depth (from the surface) of a void is filled, a sufficiently smooth coating results. If less than this amount is used, then the sink mark of the underlying void may be seen due to mere "bridging" of the defect opening. In this context, bridging is when a thin film (typically, less than 4 mils) covers a defect (from the surface down, as opposed to the bottom up) and upon curing, the thin film sags into the defect, creating a sink mark on the surface of the coating.

Figure 3:
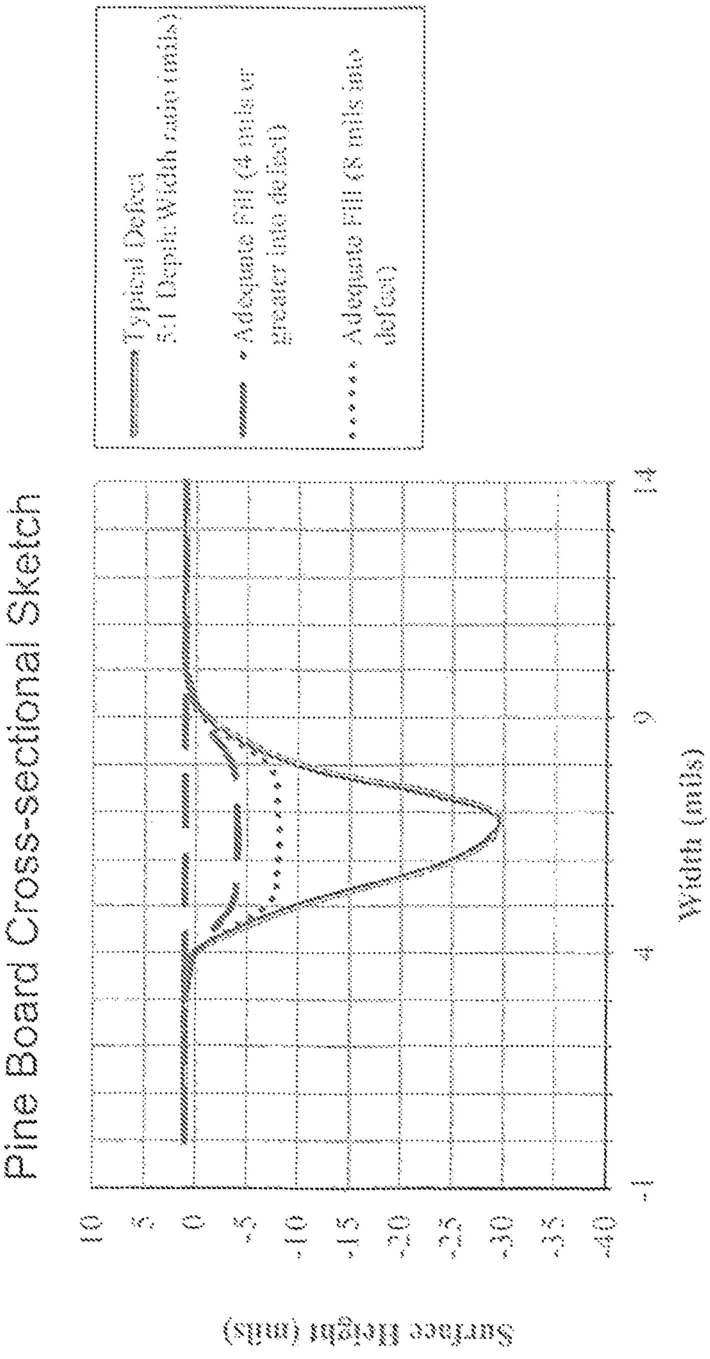
FIG. 3 is a sketch of a cross-section of a pine board including a defect-containing surface, with adequate fill of the defect using a composition of the present disclosure.

As shown in FIG. 3, a cross-section of a pine board including an exemplary defect-containing surface (e.g., with a defect of 5:1 depth:width ratio), with adequate fill of the defect using a composition of the present disclosure (e.g., showing fill to a depth of 4 mils or 8 mils).

Figure 4:
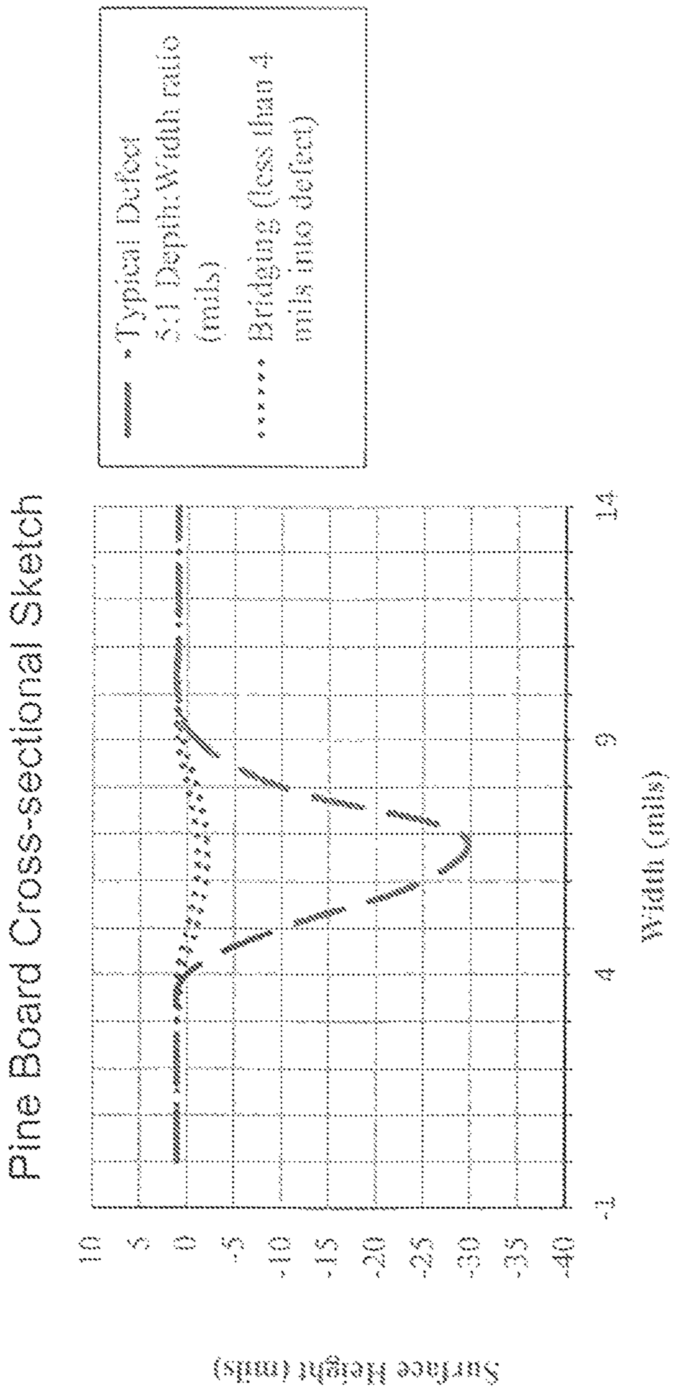
FIG. 4 is a sketch of a cross-section of a pine board including a defect-containing surface, with less than adequate fill of the defect—bridging the defect.

In contrast, as shown in FIG. 4, a cross-section of a pine board including a defect-containing surface (e.g., with a defect of 5:1 depth:width ratio), with less than adequate fill of the defect (e.g., showing less than 4 mils deep fill)—bridging the defect.

In certain embodiments, applying a curable coating composition is done in a continuous process. In this context, a "continuous" process involves coating an entire surface of a solid wood component (e.g., a board) of indeterminate length and/or a sequential feed of a significant number of wood components (e.g., boards) with continuously coating (e.g., whether there was a board present or not).

Also, in certain embodiments, a surface of a solid wood component has a continuous coating thereon. A continuous coating is one that covers at least a majority of one plane (i.e., one surface) of a solid wood component, including within the voids. Preferably, a continuous coating is one that covers an entire surface of a solid wood component, including within the voids.

Typically, according to the present disclosure, applying a curable coating composition and applying pressure occur in a reverse-roll filling process. This can be carried out by an apparatus which combines a filling function with a continuous coating function. An exemplary apparatus is the well-known reverse-roll filling machine, or RRFM, such as that available from Dubois Equipment Company, Inc., Jasper, Ind. referred to as the Dubois Reverse Roll Coater/Fill Coater.

A typical reverse-roll filling machine first applies an excess amount of a coating composition (typically, a fluid coating material) to a surface, and then doctors off the excess material using a reverse roll in contact, or in close proximity, to the surface being coated. In addition, the reverse roll produces pressure in the coating layer that tends to force the coating composition into narrower and deeper fissures and voids than might otherwise occur in more conventional coating processes. In the case of hardwoods, the reverse wiping roll can contact the wood surface with a relatively high level of pressure, without damaging the wood. It has been found, however, that the conventional use of RRFM's on softer woods is less effective, since the high pressure levels used for hardwoods tend to damage softer woods, or in some cases produce new surface grain structures that were not present before coating.

It has been found, however, that when an RRFM is operated in a different mode, hereinafter called the fixed gap, or interference, mode, high levels of penetration of a coating material into voids (e.g., fissures and other deep narrow voids) can be achieved without the damaging pressures used for hardwoods (which are typically 250 psi or greater). In the fixed gap mode, the gap through which a wood component (e.g., workpiece) must pass (i.e., beneath the reverse wiping roll) is controlled to be slightly less, by an amount called the interference, than the thickness of the workpiece. As a result, the workpiece is compressed by the interference amount as it passes beneath the wiping roll. Since the RRFM is able to control the size of the gap in a reproducible manner, the amount of compression of the component is similarly controlled. It has been found that when the RRFM is operated in this manner, penetration of coating material into the various voids in the wood is sufficient to produce a surface of acceptable quality. Moreover, it has been found that, surprisingly, the pressure generated by the wiping roll against the wood as it passes through the gap beneath the roll is sufficient to produce good penetration of the coating composition (typically, a fluid) into the various pores and voids without damaging the wood or creating new surface texture.

Without being bound by any particular theory, it is believed that the compression of a surface region of the wood when it passes beneath the wiping roll forces air out of the fissures, voids, and even pores of the wood in the compressed region. As the compressed region leaves the roll, it re-expands, drawing in the coating fluid, in much the same manner as a sponge takes up water after being squeezed and released under water.

Referring to FIG. 1, in an exemplary embodiment, the coating composition is dispensed onto Dose roll (1). The Applicator roll (2) is brought into close proximity to the Dose roll (1). Roll spacing and contact area between Dose and Applicator (nip contact) controls the amount of coating on the Applicator roll (2). Dose and Applicator roll speeds, pressures, and rotation direction can be adjusted to achieve desired film build for wood components. Typical pressures applied by Applicator roll (2) to a wood component being coated are 1-5 pounds per square inch (psi). Generally, the Applicator roll (2) applies the coating composition while being conveyed in the forward direction.

In this exemplary embodiment in FIG. 1, downstream of the Applicator roll (2) is Wiping roll (3). The Wiping roll (3) can be stationary or rotate clockwise or counterclockwise. The Wiping roll (3) is lowered to provide pressure to the wood component. The rotation and pressure of the Wiping roll (3) serve to remove excess coating from the wood component and press coating into voids, particularly defects such as checks or splits, in the surface of the wood component. Typical pressures applied by Wiping roll (3) to a wood component are at least 30 psi, or at least 50 psi, and often up to 250 psi.

The speed difference, between the Wiping roll (3) (typically, the reverse speed) and Applicator roll (2) (typically, the forward speed) can be used as "pressure" to push coatings into the voids. Preferably, the rolls are operated at substantially the same speed (e.g., a 1:1 ratio for wiping vs conveying). For example, a conveying speed (i.e., application of the coating composition) is typically 35 feet per minute and a wiping speed (i.e., application of pressure) is 35 feet per minute in the opposite direction. Both values can fluctuate by 10% more or less than target, since some of these speeds are regulated by current draw, not by speed indicators.

The film remaining on the component is typically 0.5 mil thick, but can be anywhere from 0.1 to 2 mils thick on the surface of the wood component in areas other than where the voids are located, after 1 pass through the roll coating process. In certain embodiments, more than 1 pass through the roll coating process may be used. After each pass through the roll coater, the coating is preferably fully or partially cured prior to subsequent passes through the roll coater. In certain embodiments, the depth to which the voids are filled is discussed above (preferably, at least 4 mils of the void depth includes the coating composition). After coating is applied, the coated component is conveyed under a UV cure lamp to sufficiently harden and cure the coating film as shown in FIG. 1. Typical lamp cure systems include a reflector and microwave or arc powered mercury, iron, gallium, or similar lamps (e.g., as shown In FIG. 1). Typical energy required to cure a coating could be around 300-600 $mJ/cm^2$ and 300-800 $mW/cm^2$.

The resultant coated solid wood (preferably, softwood) component typically includes: a solid softwood component (preferably, of a fenestration unit) having at least one surface and one or more voids in the surface; and a cured coating (preferably UV-cured) disposed directly on the entire surface and within at least a portion of the one or more voids. In this context, "entire" surface means substantially all (greater than 80% of a given surface), said surface being preferably a planar surface. Preferably, at least a portion of the one or more voids have a depth of greater than 25 mils (and in certain embodiments, at least 30 mils). In certain preferred embodiments, the cured coating composition at least partially fills at least a portion of the at least one or more of the voids to a depth of at least 4 mils of the void depth. In certain embodiments, the coated solid wood also includes at least one layer of an opaque coating disposed on the cured coating (e.g., applied after UV curing of the coating composition of the present disclosure as shown in FIG. 1).

Exemplary Embodiments

1. A method of reducing waste in the production of a fenestration unit, the method comprising:
   providing a population of solid wood components used in the production of a fenestration unit, wherein each individual solid wood component may or may not include one or more voids;
   applying a curable coating composition to at least one surface of each of the population of solid wood components to form a population of coated solid wood components;
   applying pressure of at least 30 psi to the at least one coated surface to force the coating composition into at least a portion of the one or more voids, if present; and
   curing the curable coating composition on each of the coated solid wood components, thereby reducing waste of the solid wood components that include one or more voids, if present.
2. The method of embodiment 1, wherein at least 1% of the population of solid wood components includes one or more voids.
3. The method of embodiment 1 or 2, wherein at least a portion of the one or more voids has a depth of greater than 25 mils.
4. The method of any of embodiments 1 through 3, wherein applying pressure comprises applying sufficient pressure to force the curable coating composition into at least a portion of the one or more voids such that the curable coating composition at least partially fills at least a portion of the one or more voids.
5. The method of any of embodiments 1 through 4, wherein the solid wood component is a solid softwood component.
6. The method of any of embodiments 1 through 5, wherein applying a curable coating composition comprises applying the curable coating composition in a continuous process.
7. The method of any of embodiments 1 through 6, wherein applying a curable coating composition and applying pressure occur at the same time and/or at substantially the same speed.
8. The method of any of embodiments 1 through 7, wherein applying a curable coating composition and applying pressure occur in a reverse-roll filling process.
9. The method of any of embodiments 1 through 8, wherein applying a curable coating composition and applying pressure are repeated two or more times.
10. The method of any of embodiments 1 through 9, wherein the coating composition is an acrylic-based coating composition.
11. The method of any of embodiments 1 through 10, wherein the curable coating composition includes at least 30% solids.
12. The method of embodiment 11, wherein the curable coating composition includes at least 50% solids.
13. The method of embodiment 12, wherein the curable coating composition includes at least 90% solids.
14. The method of embodiment 13, wherein the curable coating composition is a 100% solids composition.
15. A method of coating a solid softwood component, the method comprising:
   providing a solid softwood component comprising one or more voids;
   applying a curable coating composition to at least one surface of the solid softwood component to form a coated solid softwood component;
   applying pressure or at least 30 psi to the at least one coated surface to force the coating composition into at least a portion of the one or more voids; and
   curing the curable coating composition to form a cured coating on the softwood component.
16. The method of embodiment 15, wherein the solid softwood component is a fenestration component.
17. The method of embodiment 15 or 16, wherein at least a portion of the one or more voids has a depth of greater than 25 mils.
18. The method of any of embodiments 15 through 17, wherein applying pressure comprises applying sufficient pressure to force the curable coating composition into at least a portion of the one or more voids such that the curable coating composition at least partially fills at least a portion of the one or more voids.
19. The method of any of embodiments 15 through 18, wherein applying a curable coating composition comprises applying the curable coating composition in a continuous process.

20. The method of any of embodiments 15 through 19, wherein applying a curable coating composition and applying pressure occur at the same time and/or at substantially the same speed.
21. The method of any of embodiments 15 through 20, wherein applying a curable coating composition and applying pressure occur in a reverse-roll filling process.
22. The method of any of embodiments 15 through 21, wherein applying a curable coating composition and applying pressure are repeated two or more times.
23. The method of any of embodiments 15 through 22, wherein the coating composition is an acrylic-based coating composition.
24. The method of any of embodiments 15 through 23 further comprising applying at least one layer of an opaque coating composition over the cured coating.
25. The method of any of embodiments 15 through 24, wherein the curable coating composition includes at least 30% solids.
26. The method of embodiment 25, wherein the curable coating composition includes at least 50% solids.
27. The method of embodiment 26, wherein the curable coating composition includes at least 90% solids.
28. The method of embodiment 27, wherein the curable coating composition is a 100% solids composition.
29. A coated solid softwood component prepared by the method of any of embodiments 15 through 28.
30. A coated solid softwood component comprising:
   a solid softwood component having at least one surface and one or more voids in the surface, wherein at least a portion of the one or more voids has a depth of greater than 25 mils; and
   a cured coating disposed directly on the entire surface and within at least a portion of the one or more voids to a depth of at least 4 mils.
31. The method or component of any of embodiments 1 through 30, wherein the voids comprise imperfections.
32. The component of embodiment 30 or 31 further comprising at least one layer of an opaque coating disposed on the cured coating.
33. A coated component of a fenestration unit, comprising:
   a solid softwood component of a fenestration unit, the component having at least one surface and one or more voids in the surface; and
   a cured coating disposed directly on the entire one surface and within at least a portion of the one or more voids to a depth of at least 4 mils.
34. The component of embodiment 33, wherein at least a portion of the one or more voids has a depth of greater than 25 mils.
35. The component of embodiment 33 or 34, wherein the voids comprise imperfections.
36. The component of any of embodiments 33 through 35 further comprising at least one layer of an opaque coating disposed on the cured coating.

EXAMPLES

Objects and advantages of this disclosure are further illustrated by the following examples, but the particular materials and amounts thereof recited in these examples, as well as other conditions and details, should not be construed to unduly limit this disclosure.

Example 1 (Comparative)

I. Sample Preparation
Wood Species: Ponderosa Pine
Sample dimensions and cross sectional profile:
1.328 inches (in) thick
1.422 in wide (face affected by roll coated filler product)
30.719 in long
Only 1 side of the 4 sided profile was coated for tests.
For methods other than roll or spray coating, parts were visually screened for defects visible to human eye and those parts were chosen for testing. For defect filling, parts with and without visible defects were chosen, many of which had defects smaller than humans could detect. These defects showed up after painting, on those 3 surfaces that were not filled/coated.
Method of Making Samples:
Milling, no sanding.
Sample Pre-Treatment and Storage Conditions:
Ambient storage and humidity for less than 24 hours (hrs) prior to test.
Initial inspection prior to filling to locate checks, splits, and/or cracks in substrates:
Manual inspection conducted at arm's length under factory lighting conditions.
II. Filling Process
Filling Material (Solid Putty):
"Color Putty Nailhole Filler" from Color Putty Co, Inc., Monroe, Wis.
Specific gravity=2.1
Application Method:
Defects screened visually, putty applied by wiping generous amount into the defect (check/split/hairline crack). Excess putty wiped off with putty knife. Putty was applied and dried under ambient conditions (typical plant environment is about 70-90° F. and 40-80% relative humidity (RH), no forced air (fans) or other curing/drying aids).
Parts were allowed to sit for 24 hrs prior to painting.
Mild sanding (240 grit paper) by hand was conducted as needed to feather the edges of putty into the surface of the part.
Subsequent Treatment Method:
All parts were painted with a primer and topcoat from PPG Industries, Inc., Pittsburgh, Pa. W51146 Polyurea Primer—applied first at 4-8 wet mils by electrostatic disc for a final dry film of 2.0-4.0 mils; cured for 15 minutes (min) at 120° F. and ambient humidity.
W5646-1 Flexacron White Topcoat—applied second at 3-5 wet mils by electrostatic disc for a final dry film of 1.2-2.0 mils; cured for 90 min at 130° F. and ambient humidity.
III. Evaluation
Test Methods:
ASTM D3459-98—Humid/Dry cycling—5 sample pieces (size above) at least 1 defect per sample, 24 cycles of high temp/high humidity and lower temp/lower humidity.
ASTM D3359-09—Adhesion by Tape Test, Method B—5 sample pieces (size above) tested at the location of the defect, at both ambient conditions (dry) and after water immersion.
ASTM D2247-11—Humidity Resistance—5 samples pieces (size above) at least 1 defect per sample, 500 hrs exposure. 100° F./100% RH.
Results Showed the Following:
Complete fill of the defect was achieved with the putty knife, as judged by visual inspection (non-magnified).
Appearance of the defect area was only marginally acceptable, despite sanding and painting. The smooth texture of the putty did not look exactly like the wood grain structure of the adjacent painted wood. Also, the edge of the putty area was slightly noticeable upon close inspection.

Additionally, the edges of the putty showed some peeling/blistering tendency after the humidity resistance test (all samples) and humid/dry cycling (all samples). Coating adhesion by tape test showed poor adhesion of primer to putty after water immersion (all samples showed some blistering due to adhesion loss between putty and primer). Also, after water immersion, some samples (4 of 5) showed loss of adhesion between putty and wood, allowing the putty to "pop" up from the defect.

This putty process of Example 1 would require some pre-screening of the substrate to locate defects and target the material filling operation. And, due to some unacceptable performance in the environmental stress testing, this method would not be desirable for mass production.

Example 2 (Comparative)

I. Sample Preparation

Same as in Example 1.

II. Filling Process

Filling Material (Liquid):

"Titebond III Ultimate Wood Glue," Franklin International, Columbus, Ohio

Application Method:

Nozzle application with putty knife/manual smoothing. Defects screened visually, glue applied by squeezing generous amount into the defect (check/split/hairline crack). Excess glue wiped off with putty knife and paper towel. Glue applied and dried under ambient conditions (typical plant environment is about 70-90° F. and 40-80% RH, no forced air (fans) or other curing/drying aids).

Parts were allowed to sit for 24 hrs prior to painting.

Mild sanding (240 grit paper) by hand conducted as needed to feather the edges of glue into the surface of the part.

Subsequent Treatment Method:

All parts were painted with a primer and topcoat from PPG Industries, Inc., Pittsburgh, Pa. as in Example 1.

III. Evaluation

Test Methods:

Same as in Example 1.

Results Showed the Following:

In some cases (3 of 5 samples) complete fill was not achieved, as voids could be seen in the glued crevice and the glued surface had sunk into the defect (glue shrink)—as judged by visual inspection (non-magnified).

Appearance of the defect area was only marginally acceptable, despite sanding and painting. The depression in the wood surface at the defect site was not completely filled by primer and paint in subsequent steps, and the defect essence could still be seen.

Additionally, primer and topcoat showed some peeling tendency after the humidity resistance test (2 of 5 samples) and humid/dry cycling (3 of 5 samples). Coating adhesion by tape test showed poor adhesion of primer to glue after water immersion (4 of 5 samples). Also, after water immersion, some samples (4 of 5) showed loss of adhesion between glue and wood, defect to open up, cracking the primer and paint layers, and exposing the defect crack underneath.

This glue process of Example 2 would require some pre-screening of the substrate to locate defects and target the material filling operation. And, due to some unacceptable performance in the environmental stress testing, this method would not be desirable for mass production.

Example 3 (Comparative)

I. Sample Preparation

Same as in Example 1.

II. Filling Process

Filling Material (Liquid):

"W57220B PPG Environ-Waterbased End Grain Sealer," PPG Industries, Inc., Pittsburgh, Pa.

Viscosity 35-45 seconds—No. 3 Zahn. 45+/−2% solids by weight.

Application Method:

Paint roller application with rubber squeegee for smoothing/removing excess film. Defects screened visually, sealer applied by rolling 3-5 wet mils of coating onto surface of part, directed over the defect (check/split/hairline crack). Excess sealer wiped off with rubber squeegee by hand. Final wet film approximately 1 mil, dry film 0.5 mil.

Applied and dried under ambient conditions (typical plant environment is about 70-90° F. and 40-80% RH, no force air (fans) or other curing/drying aids).

Parts were allowed to sit for 24 hrs prior to painting.

No sanding prior to painting.

Subsequent Treatment Method:

All parts were painted with a primer and topcoat from PPG Industries, Inc., Pittsburgh, Pa. as in Example 1.

III. Evaluation

Test Methods:

Same as in Example 1.

Results Showed the Following:

In all cases (5 of 5) complete fill was achieved.

Appearance of the defect area was acceptable after priming and painting.

Adhesion of all coatings was acceptable on all samples after the humidity resistance test (5 of 5 samples) and humid/dry cycling (5 of 5 samples). However, coating adhesion by tape test showed poor adhesion of primer to sealer after water immersion (5 of 5 samples). Also, after water immersion, some samples (3 of 5) showed loss of adhesion between sealer and wood, peeling off the substrate, uncovering the defect.

The material of Example 3 could be operated in a continuous fashion to preemptively fill defects, with a process such as a roll coater, but the performance of this material after water immersion was not acceptable for adhesion.

Example 4 (Comparative)

I. Sample Preparation

Same as in Example 1.

II. Filling Process

Filling Material (Liquid):

"W51146 PPG Polyurea Primer," PPG Industries, Inc., Pittsburgh, Pa.

Viscosity 35-48 seconds—No. 4 Ford. 63.5+/−2% solids by weight.

Application Method:

Electrostatic disc application at ambient conditions. Defects screened visually. Primer applied by spraying 6-10 wet mils of coating onto surface of part, completely covering the defect (check/split/hairline crack). Final dry film approximately 3-5 mils.

Applied under ambient conditions and cured for 15 min at 120° F. and ambient humidity (typical plant environment is about 70-90° F. and 40-80% RH).

Parts had the standard 15 min cure at 120° F. and ambient humidity prior to topcoat application. No sanding was done prior to painting (standard practice).

Subsequent Treatment Method:

All parts were painted with a topcoat from PPG Industries, Inc., Pittsburgh, Pa. as in Example 1. This filling technique was basically to apply a heavy primer film to hopefully bridge and cover all defects.

III. Evaluation

Test Methods:

Same as in Example 1.

Results Showed the Following:

In all cases (5 of 5) incomplete fill was observed. The coating did not penetrate the defects, but instead it "bridged" the defects or clung to the sides of the defects. Some "bridged" samples showed coating sag into the defect, leaving presence of the defect still objectionable. Those samples that did not bridge, did not cover the defect which also failed visual criteria (3 of 5 tended toward bridging, 2 of 5 tended toward no fill, no bridge).

Appearance of the defect area was not acceptable on any parts after priming and painting. Adhesion of all coatings was acceptable on all samples after the humidity resistance test (5 of 5 samples) and humid/dry cycling (5 of 5 samples). Coating adhesion by tape test showed good adhesion of primer to wood after water immersion (5 of 5 samples). In the 3 of 5 cases where bridging occurred, 1 of 3 showed a defect reopen after water immersion, due to the defect expanding and the primer and topcoat cracking, 1 of 3 showed a defect reopen after the humid/dry cycling test, and 1 of 3 samples maintained the coating bridge through all tests.

Subsequent Treatment Method:

All parts were painted with a primer and topcoat from PPG Industries, Inc., Pittsburgh, Pa. as in Example 1 except that parts were painted immediately after curing (less than 15 min lag) with no sanding.

III. Evaluation

Test Methods:

Same as in Example 1.

Results Showed the Following:

In all cases (5 of 5) complete fill was observed. Appearance of the defect area was acceptable on all parts after priming and topcoating.

Adhesion of all coatings was acceptable on all samples after the humidity resistance test (5 of 5 samples) and humid/dry cycling (5 of 5 samples). Coating adhesion by tape test showed good adhesion of primer to wood after water immersion (5 of 5 samples) as well as dry (5 of 5).

Example 5, the process using a reverse roll coater, UV cure, 100% solids epoxy-acrylic filler material to fill defects in solid pine substrate is preferable. The process not only provides robust adhesion, but adequate fill of defects both initially and after environmental stress testing.

Test Results of Examples 1-5

| Ex. | Fill | Defect Hiding Visual Evaluation | Humidity Resistance Adhesion[1] | Humidity Cycling Adhesion[2] | Adhesion filler to Wood After Water Immersion[3] | Adhesion Primer to Filler After Water Immersion[3] |
|---|---|---|---|---|---|---|
| 1 | Complete | Incomplete | Peeling and blistering | Peeling and blistering | Poor | Poor |
| 2 | Incomplete | Incomplete | Peeling | Peeling | Poor | Poor |
| 3 | Complete | Acceptable | Acceptable | Acceptable | Poor | Poor |
| 4 | Incomplete | Incomplete | Acceptable | Acceptable | Acceptable | Acceptable |
| 5 | Complete | Acceptable | Acceptable | Acceptable | Good | Good |

[1]ASTM D2247-11 - Humidity Resistance
[2]ASTM D3459-98 - Humid/dry Cycling
[3]ASTM D3359-09 - Adhesion by Tape Test - Method B Example 4 spraying of excess primer did not achieve complete fill and aesthetic goals, and as such, it is not preferable, although it is acceptable.

Example 5

I. Sample Preparation

Same as in Example 1.

II. Filling Process

Filling Material (Liquid):

Viscosity 15,000-21,000 cPs. 100.0+/−0.5% solids by weight.

Application Method:

Applied via reverse roll coater, Dubois model RRC-20 Reverse Roll Coater.

Dubois Equipment Company, Inc., Jasper, Ind.

Applied 0.5-1.0 mil thick. Coating fluid heated to 90-100° F. Applied under ambient conditions (typical plant environment is about 70-90° F. and 40-80% RH). Wiping pressure controlled via interference. Target=0.05 inch.

Coating was cured with a Miltec UV-20-20-2, 2-lamp UV unit, consisting of two H bulbs, 400 Watts each. Energy dose to part 500-900 mJ/cm$^2$ and 2000-3000 mW/cm$^2$ UVA. Process speed 55+/−5 feet per minute. Wiping speed=55+/−5 feet per minute (reverse direction).

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed:

1. A method of reducing waste in the production of a fenestration unit, the method comprising:

providing a population of solid wood components used in the production of a fenestration unit, wherein each individual solid wood component may or may not include one or more voids;

applying, with an applicator roll, a curable coating composition to at least one surface of each of the population of solid wood components to form a population of coated solid wood components;

applying pressure to the at least one coated surface using a wiping roll positioned downstream from the application roll, wherein a gap through which the solid wood components must pass under the wiping roll is set to be less than the thickness of the solid wood components forming a compressed region of the solid wood component and forcing air out of fissures, voids, and pores in the compressed region, releasing the applied pressure from the at least one coated surface as the solid wood component leaves the wiping roll causing the compressed region to re-expand drawing in the curable coating composition into the solid wood component; and curing the curable coating composition on each of the coated solid wood components, thereby reducing waste of the solid wood components that include one or more voids.

2. The method of claim 1, wherein at least 1% of the population of solid wood components includes one or more voids.

3. The method of claim 1, wherein at least a portion of the one or more voids has a depth of greater than 25 mils.

4. The method of claim 1, wherein applying pressure comprises applying sufficient pressure to force the curable coating composition into at least a portion of the one or more voids such that the curable coating composition at least partially fills at least a portion of the one or more voids.

5. The method of claim 1, wherein the solid wood component is a solid softwood component.

6. The method of claim 1, wherein applying a curable coating composition comprises applying the curable coating composition in a continuous process.

7. The method of claim 1, wherein applying a curable coating composition and applying pressure occur at the same time and/or at substantially the same speed.

8. The method of claim 1, wherein applying a curable coating composition and applying pressure are repeated two or more times.

9. The method of claim 1, wherein the coating composition is an acrylic-based coating composition.

10. The method of claim 1, wherein the curable coating composition is a 100% solids composition.

11. A method of coating a solid softwood component, the method comprising:

providing a solid softwood component comprising one or more voids;

applying a curable coating composition to at least one surface of the solid softwood using an applicator roll;

applying pressure to the at least one coated surface using a wiping roll positioned downstream from the application roll, wherein a gap through which the solid softwood components must pass under the wiping roll is set to be less than the thickness of the solid softwood components forming a compressed region of the solid softwood component and forcing air out of fissures, voids, and pores in the compressed region, releasing the applied pressure from the at least one coated surface as the solid softwood component leaves the wiping roll causing the compressed region to re-expand drawing in the curable coating composition into the solid softwood component; and curing the curable coating composition to form a cured coating on the softwood component.

12. The method of claim 11, wherein the solid softwood component is a fenestration component.

13. The method of claim 11, wherein at least a portion of the one or more voids has a depth of greater than 25 mils.

14. The method of claim 11, wherein applying pressure comprises applying sufficient pressure to force the curable coating composition into at least a portion of the one or more voids such that the curable coating composition at least partially fills at least a portion of the one or more voids.

15. The method of claim 11, wherein applying a curable coating composition comprises applying the curable coating composition in a continuous process.

16. The method of claim 11, wherein applying a curable coating composition and applying pressure occur at the same time and/or at substantially the same speed.

17. The method of claim 11, wherein applying a curable coating composition and applying pressure are repeated two or more times.

18. The method of claim 11, wherein the coating composition is an acrylic-based coating composition.

19. The method of claim 11 further comprising applying at least one layer of an opaque coating composition over the cured coating.

20. The method of claim 11, wherein the curable coating composition is a 100% solids composition.

21. A coated solid softwood component prepared by the method of claim 11.

22. The method of claim 1, wherein applying pressure comprising applying at least 30 psi pressure.

23. The method of claim 11, wherein applying pressure comprising applying at least 30 psi pressure.

* * * * *